United States Patent
Hicks

(10) Patent No.: US 9,719,350 B2
(45) Date of Patent: Aug. 1, 2017

(54) MOTOR/ENGINE WITH ROTATING PISTONS

(71) Applicant: Edward Alan Hicks, Englewood, FL (US)

(72) Inventor: Edward Alan Hicks, Englewood, FL (US)

(*) Notice: Subject to any disclaimer, the term of this patent is extended or adjusted under 35 U.S.C. 154(b) by 0 days.

(21) Appl. No.: 15/115,445

(22) PCT Filed: Mar. 14, 2016

(86) PCT No.: PCT/US2016/022325
§ 371 (c)(1),
(2) Date: Jul. 29, 2016

(87) PCT Pub. No.: WO2016/145440
PCT Pub. Date: Sep. 15, 2016

(65) Prior Publication Data
US 2017/0044899 A1    Feb. 16, 2017

Related U.S. Application Data

(60) Provisional application No. 62/131,920, filed on Mar. 12, 2015.

(51) Int. Cl.
*F02B 53/12*    (2006.01)
*F01C 1/063*    (2006.01)
(Continued)

(52) U.S. Cl.
CPC ............ *F01C 1/063* (2013.01); *F01C 21/008* (2013.01); *F01C 21/04* (2013.01); *F01C 21/08* (2013.01);
(Continued)

(58) Field of Classification Search
CPC .................................. F01C 1/063; F01C 21/08
(Continued)

(56) References Cited

U.S. PATENT DOCUMENTS 2,373,791 A * 4/1945 Stewart .................. F01C 1/063
                                                                  418/35
5,224,847 A    7/1993 Kurisu
(Continued)

FOREIGN PATENT DOCUMENTS

DE    WO 9001676 A1 *  2/1990  .............. F01C 1/063
WO    WO 8606786 A1 * 11/1986  .............. F01C 1/063

OTHER PUBLICATIONS

Toroidal Internal-Combustion Engines. Retrieved from <http://www.douglas-self.00m/MUSEUM/POWER/unusuallCeng/toroidalIC/toroidalIC.htm#morg> on Apr. 14, 2016.

*Primary Examiner* — Phutthiwat Wongwian
*Assistant Examiner* — Ngoc T Nguyen
(74) *Attorney, Agent, or Firm* — Crawford Maunu PLLC

(57) ABSTRACT

Aspects of the present disclosure are directed to apparatuses and methods involving an engine and/or motor having piston lobes that rotate with a drive shaft or shafts, which may be implemented with a toroidal-based engine housing. As may be implemented with some embodiments, an apparatus includes drive shafts having a common axis of rotation, with each drive shaft operable to rotate independently of the other drive shaft. The housing extends around the drive shafts, and defines a sidewall of a chamber having inlet and exhaust ports. Clutch bearings limit rotation of the drive shafts to a common rotational direction. One or more piston lobes are connected to each drive shaft, with each piston lobe being disposed within the chamber and operable to move circumferentially within the chamber about the axis of rotation, with the drive shaft to which it is coupled.

32 Claims, 17 Drawing Sheets

(51) Int. Cl.

| | |
|---|---|
| *F01C 21/08* | (2006.01) |
| *F02B 53/00* | (2006.01) |
| *F01C 21/00* | (2006.01) |
| *F01C 21/04* | (2006.01) |
| *F01C 21/10* | (2006.01) |
| *F01C 21/18* | (2006.01) |
| *F02B 53/10* | (2006.01) |

(52) U.S. Cl.
CPC ............ *F01C 21/106* (2013.01); *F01C 21/18* (2013.01); *F02B 53/00* (2013.01); *F02B 53/10* (2013.01); *F02B 53/12* (2013.01); *Y02T 10/17* (2013.01)

(58) Field of Classification Search
USPC ............................. 123/210, 241, 18 R, 18 A
See application file for complete search history.

(56) References Cited

U.S. PATENT DOCUMENTS

| | | | |
|---|---|---|---|
| 6,948,473 B2* | 9/2005 | Udy | ........................ F01C 1/063 123/245 |
| 7,500,462 B2* | 3/2009 | Karnes | ................ F01C 21/0836 123/241 |
| 2006/0225691 A1 | 10/2006 | McCoin et al. | |
| 2007/0235001 A1 | 10/2007 | Liang | |
| 2008/0050258 A1 | 2/2008 | Wright | |
| 2011/0185998 A1 | 8/2011 | Murphy et al. | |
| 2015/0260092 A1* | 9/2015 | Epman | ................... F01C 1/063 123/210 |

\* cited by examiner

MOTOR/ENGINE WITH ROTATING PISTONS

FIELD

Aspects of various embodiments are directed to a motor and/or engine, involving pistons that rotate with a drive shaft and within a housing.

BACKGROUND

Motors and engines often use a cylindrical chamber that houses a piston that moves up and down in the chamber. At the top of the chamber, an air/fuel mixture is compressed and if ignited, generates pressure that drives the piston back down the chamber. The lower part of the piston is connected to an offset driveshaft which pushes the piston back up again as the piston goes through its full cycle of motion.

While these approaches have been used with much success, there are challenges to efficiency. For instance, moving the piston toward top dead center during compression, reversing the piston's direction by accelerating the piston in an opposite direction upon ignition, then reversing the piston again for compression can be a relatively inefficient manner in which to generate power. Further, with various cycles implemented for intake and exhaust, inefficiencies can grow. These approaches are also subject to friction and heat loss. These and other matters have presented challenges to the efficient use of motors and engines for a variety of applications.

SUMMARY

Various example embodiments are directed to apparatuses and methods involving an engine and/or motor having piston lobes that rotate with a drive shaft or drive shafts, which may be implemented with a toroidal-based engine housing. Utilizing pistons that move with each other through a chamber defined by the engine housing and the pistons themselves, various efficiency issues as noted above can be addressed with power transfer from a pressure source that is internal or external to the housing. Various embodiments further utilize magnetic material in pistons rotating circumferentially within the housing, which can mitigate or prevent piston slap and further utilize momentum generated from a decelerating piston to accelerate the adjacent piston via magnetic repulsion. In some implementations, such magnetic material is used for generating electricity.

According to an example embodiment, an apparatus includes first and second drive shafts having a common axis of rotation, with each drive shaft operable to rotate independently of the other drive shaft. The housing extends around the drive shafts, and defines a sidewall of a chamber having inlet and exhaust ports. Each drive shaft is coupled to a clutch bearing that limits rotation of the drive shaft to a rotational direction that is common to both drive shafts. One or more piston lobes are also connected to each drive shaft (e.g., with a direct-drive connection), with each piston lobe being disposed within the chamber and operable to move circumferentially within the chamber about the axis of rotation, with the drive shaft to which it is coupled.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1A:
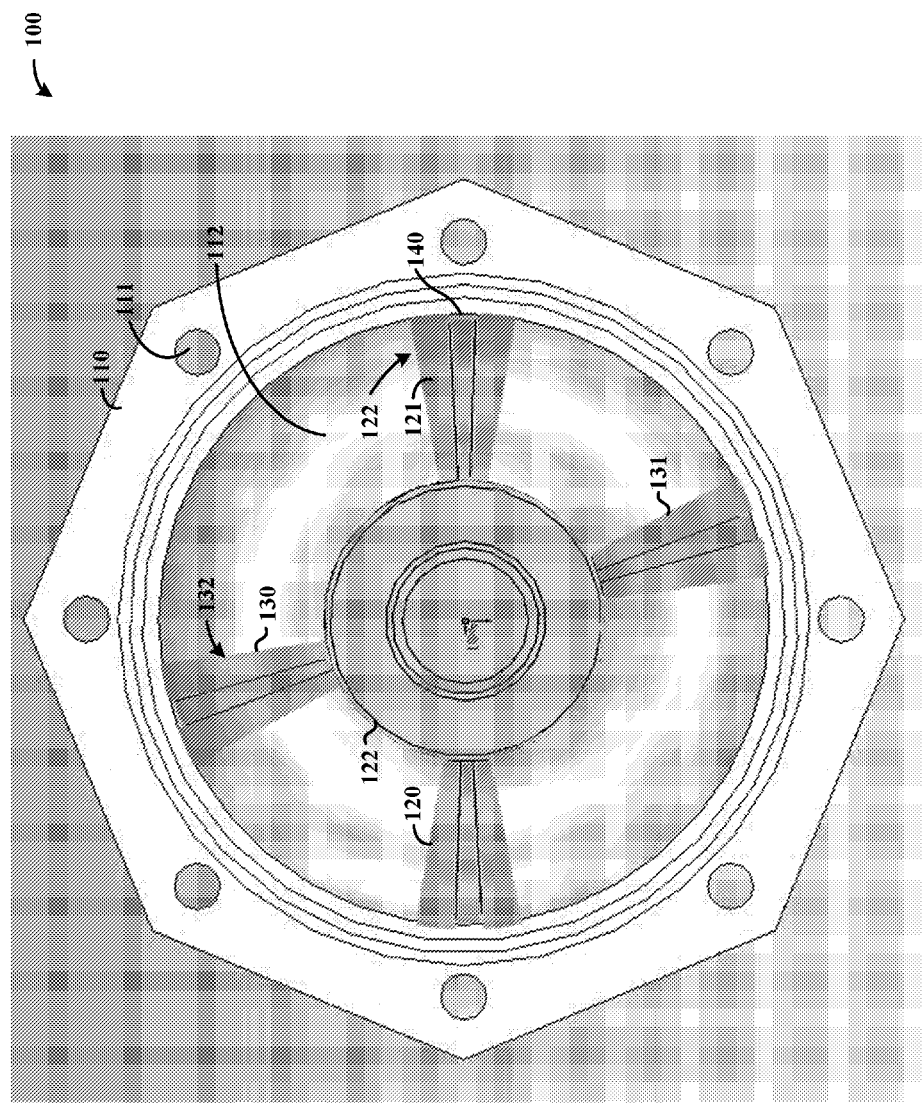
FIG. 1A shows a cut-away view of half of a clam-shell type housing with respective pairs of piston lobes coupled to different shafts, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving pistons that rotate with a shaft, with the direction of rotation being limited. For various embodiments, this approach permits utilization of pistons having a leading surface that acts as a fixed or nearly-fixed surface for containing an expanding gas, and a trailing surface that utilizes pressure to drive the shaft to which it is coupled in the direction of rotation. In certain implementations, aspects of the present disclosure have been shown to be beneficial when used in the context of expanding gas (e.g., refrigerant) or combustion, within chambers defined by the leading/trailing edge of adjacent piston lobes and interior walls of a motor/engine housing.

While not necessarily so limited, various aspects may be appreciated through a discussion of examples using such exemplary contexts.

In various example embodiments, aspects of the present disclosure are directed to converting pressure energy to mechanical energy in a toroid-based chamber. Certain aspects involve a motor that uses an exterior pressure source, and other aspects involve an engine that generates pressure by use of an internal combustion type of system. Rotating combustion/pressure sub-chambers ratchet around the chamber and generate mechanical energy that is applied to central drive shafts. Various embodiments utilize two separate drive shafts, which may interlock, to maximize energy garnered from the pressure. The mechanical power provided via the drive shaft(s) can be utilized in a variety of manners, such as to directly drive mechanical components such as a wheel or machine, or to drive an electrical generator for generating electricity. For instance, electrical windings may be employed around the chamber and utilized to collect inductive energy generated by magnetic fields of the magnetic material in the piston lobes. Clutch bearings or other mechanisms can be employed to limit rotation of the drive shafts to a single direction, which can further be utilized to generate the sub-chambers in a manner such that the energy is applied to the drive shafts in a common rotational direction.

In various embodiments, central rotating piston lobes drive individual sections of the drive shaft or respective drive shafts, which can be effected in a direct-drive manner. Energy generated by internal pressure on the piston lobes is used to drive the piston lobes around the chamber. The lobes can be of various degrees apart and of various degrees in width in order to suit a desired amount of revolutions per minute or torque. The piston lobes are connected to the drive shaft(s) at a central region of the chamber, which acts as a seal to ensure that the gases generated by the internal combustion or gases imported from the external source do not seep through the center axle area in the drive shaft.

In some embodiments, each drive shaft is connected one side of a hub assembly and floats in a tongue and groove manner with the other drive shaft that is connected to another hub and piston assembly. For instance, the drive shafts may be set so that they both can move independently through the use of a keyed assembly that allows for the piston lobes to move freely, and yet still provide desirable/maximum torque. One-way clutch bearings can be coupled to the drive shafts to ensure that the shafts rotate in one direction at a time. In this context, as each sub-chamber (also referred to as a piston chamber) fills up with pressurized gaseous material, the pistons can only move toward the path of least resistance as controlled via the clutch bearings.

A variety of intake and exit port arrangements can be used to utilize pressurized gas for driving the piston lobes and, therein, the drive shaft(s). Airflow may be set by putting an exhaust port at a maximum range of travel of each piston lobe from an intake manifold for an external pressure embodiment, or a degree location on an internal combustion embodiment. As the sub-chamber defined by leading and trailing surfaces of adjacent piston lobes fills with gas, the adjacent piston lobes move away from each other. Rotation is limited to the same direction, the gas moves the piston lobe toward the exhaust manifold port. Upon rapid expansion, gas pressure upon the leading surface of one of the piston lobes may be sufficient to slow or stop movement of that piston lobe (via the clutch bearing), thus driving the other piston lobe forward via pressure upon its trailing surface. When the piston lobe has reached its maximum expansion, the port is closed on the exhaust manifold side (by virtue of movement of the piston lobe). This approach can eliminate the need for valves on the exhaust port (or similarly on intake ports).

In various embodiments, one or more mechanisms operate to prevent or mitigate the piston lobes from slapping into each other. In some embodiments, a spring-type mechanism operates in this context, as may for example be implemented with the drive shafts. In other embodiments, each piston lobe contains magnetic material, such as rare earth magnets of considerable strength. Such magnets can be implemented to provide a force that repels the piston lobes away from each other.

External pressure may be provided by a pressurized gas, such as by utilizing a heat exchanger (e.g., with refrigerant that expands upon conversion between states or otherwise). In this context, an air conditioning type system can be used to generate torque as the air is leaving the low side and entering the high side of the system. This in turn can be used to drive a generator that can be used to recycle some or most of BTU's that would otherwise be lost, back into energy.

Pressure may be generated via combustion, which may be provided using one or more of a variety of gases and combustion techniques. For instance, a spark and fuel air mixture or a glow plug and fuel air mixture may provide an expanding field of pressure that expands between lobe-shaped pistons, which propels the pistons away from each other. Such a spark or glow plug can be implemented in a sidewall of the chamber in which the piston lobes move, or in one of the piston lobes itself (e.g., in the leading surface of one of the piston lobes facing a sub-chamber in which combustion occurs). Each sub-chamber defined by adjacent surfaces of pistons may be utilized for combustion, alternating sub-chambers may be utilized for combustion, or some other combination of chamber(s). A carburetor or fuel injection system can be used to provide increase and decrease in speed.

In accordance with one or more embodiments, an apparatus includes a housing in which various piston lobes rotate circumferentially along a common rotational path, with a drive shaft to which the piston lobes are coupled. Specifically, first and second drive shafts having a common axis of rotation, with each drive shaft operable to rotate independently of the other drive shaft. The housing extends around the drive shafts, and defines a sidewall of a chamber having inlet and exhaust ports. Each drive shaft is coupled to a clutch bearing or other mechanical component that restricts rotation of the drive shaft to a common direction. The piston lobes are also connected to one of the drive shafts (e.g., with a direct-drive connection). The piston lobes may, for example, include a pair or pairs of piston lobes connected to the drive shaft and extending in opposite directions, providing counter-balancing. Certain embodiments employ other counter balancing, such as a weight offset from a single piston lobe at 180 degrees relative to the drive shaft to which the piston lobe is connected.

In various contexts, a leading surface of each piston lobe forms an enclosed portion of the chamber bound by the leading surface, an interior surface of the chamber and a trailing surface of one of the piston lobes connected to the other drive shaft. This sub-chamber can be implemented for combustion, or for accepting gas therein that drives the pistons. For instance, each shaft and the piston lobes connected thereto may be operable to rotate the shaft utilizing gas pressure on the trailing surface of one of the piston lobes while also utilizing a clutch bearing to prevent rotation of the other shaft in the opposite rotational direction. This gas pressure can be provided through an inlet port, or via combustion.

In various embodiments, each shaft and the piston lobes connected thereto rotate as follows. Gas pressure is provided in a sub-chamber bound by a trailing surface of one of the piston lobes and a leading surface of an adjacent one of the piston lobes. A clutch bearing prevents rotation of the shaft to which the piston lobe having the leading surface is connected, such that the gas pressure forces the piston having the trailing surface to rotate.

In various embodiments, piston lobes characterized herein are arranged circumferentially around drive shafts and equidistant from the axis of rotation. A seal around an outer sidewall of the piston lobes interfaces with an inner sidewall of the chamber and therein separates portions of the chamber respectively bound by leading and trailing surfaces of the piston lobe. The seal may, for example, be provided by a piston ring in a groove around the piston lobe, which may extend less than all the way around to facilitate expansion and misalignment.

In some implementations (e.g., with externally-provided gas pressure), the piston lobes, drive shafts, chamber and clutch bearing draw gas in through an inlet port, and contain the gas within a portion of the chamber bound by sidewalls of the chamber and respective leading and trailing surfaces of adjacent ones of the piston lobes. Expansion of the gas is utilized to drive the piston lobe having the trailing surface that bounds the portion of the chamber. Upon rotation of the driven piston lobe past the exhaust port, the expanded gas is exhausted from the chamber.

The shape and arrangement of the chamber/housing can be set to suit various applications. In some embodiments, the chamber and the piston lobes are circumferentially-arranged about the axis of rotation. The sidewall and piston lobes exhibit a sliding interface about sidewalls of the piston lobes, with the piston lobes separating the chamber into sub-chambers bound by the sidewalls and respective leading and trailing surfaces of adjacent piston lobes. In certain embodiments, the chamber has a toroidal-based shape and the piston lobes provide such sub-chambers within the chamber.

For various combustion embodiments, an apparatus as above includes an ignition source. The ignition source, piston lobes and clutch bearing operate to drive the drive shafts utilizing the ignition source to ignite fuel and therein generate pressure force upon a surface of one of the piston lobes, which is translated to the drive shaft connected thereto. For instance, the piston lobes, drive shafts and housing may operate with the ignition source to carry out a fuel combustion cycle for such sub-chambers as follows. In a fuel intake stage, fuel is received into the sub-chamber via the inlet port, with leading and trailing surfaces of adjacent piston lobes engaged with the housing sidewall on opposite sides of the inlet port. In a fuel combustion stage, a sealed combustion chamber is provided between the sidewall and the leading and trailing surfaces of the chamber, and the fuel is ignited therein. The ignited fuel is used to drive the shaft connected to the piston lobe having the trailing surface of the combustion chamber by applying pressure from the ignited fuel upon the trailing surface. In an exhaust stage, gas generated by the ignited fuel is exhausted via the exhaust port, with the leading and trailing surfaces of the adjacent ones of the piston lobes engaged with the sidewall on opposite sides of the exhaust port.

The interface between the piston lobes and the drive shafts, as well as the chamber defined thereby, can be implemented in a variety of manners. In some embodiments, the chamber has a toroidal-based shape with an outer surface of the drive shafts defining an inner portion of the surface of the chamber. The housing defines an outer portion of the surface of the chamber, with the respective leading and trailing surfaces of adjacent piston lobes defining sub-chambers therein. One or more seals are located between interfaces of the drive shafts and the housing.

Consistent with various embodiments, each piston lobe may include one or more magnets or other magnetic material. Adjacent piston lobes thus have magnetic polarities that tend to generate a magnetic field that repels the piston lobes from one another. In some embodiments, an electric coil is implemented to generate electricity by utilizing movement of the magnetic field generated by each magnet.

Various embodiments can be implemented in connection with one or more of those characterized in U.S. Provisional Patent Ser. No. 62/131,920, which is fully incorporated herein by reference. For instance, various embodiments may utilize approaches characterized therein, or otherwise shown in the figures.

Turning now to the figures, Figure IA shows a cut-away view of half of an apparatus 100 having a clam-shell type housing 110, with respective pairs of piston lobes coupled to different shafts, in accordance with an example embodiment. Specifically, piston lobes 120 and 121 are directly coupled to a shaft at 122, and piston lobes 130 and 131 are coupled to a different shaft (behind 122 in the view as shown). The housing 110 exhibits a toroid-type shape, with the respective piston lobes being operable to circumferentially rotate therein (e.g., in a clockwise direction). Various intake and exhaust ports may be arranged in the sidewall of the housing 110. Halves of the housing can be coupled via fasteners at the respective openings shown, with opening 111 being labeled by way of example.

Each of the piston lobes has a seal, which can be implemented at a sidewall 140 thereof. In this context, each adjacent pair of piston lobes provides for sub-chambers within the housing 110. For instance, a leading surface 132 of piston lobe 130 forms a sub-chamber with trailing surface 122 of piston lobe 121. Piston rings may be used to form such a seal, and may encircle less than all of each piston lobe in order to accommodate variations in materials such as metals used to make the piston lobes and housing, and variations created by the expansion and contraction of these materials. Such piston rings may, for example, be implemented to correct issues with direct drive motor designs that may relate to binding or catching when a central drive shaft assembly is not in perfect alignment. The piston rings can thus be implemented to allow for a bit of play in the assembly and provide compression around the entire toroid-shaped chamber.

Figure 1B:
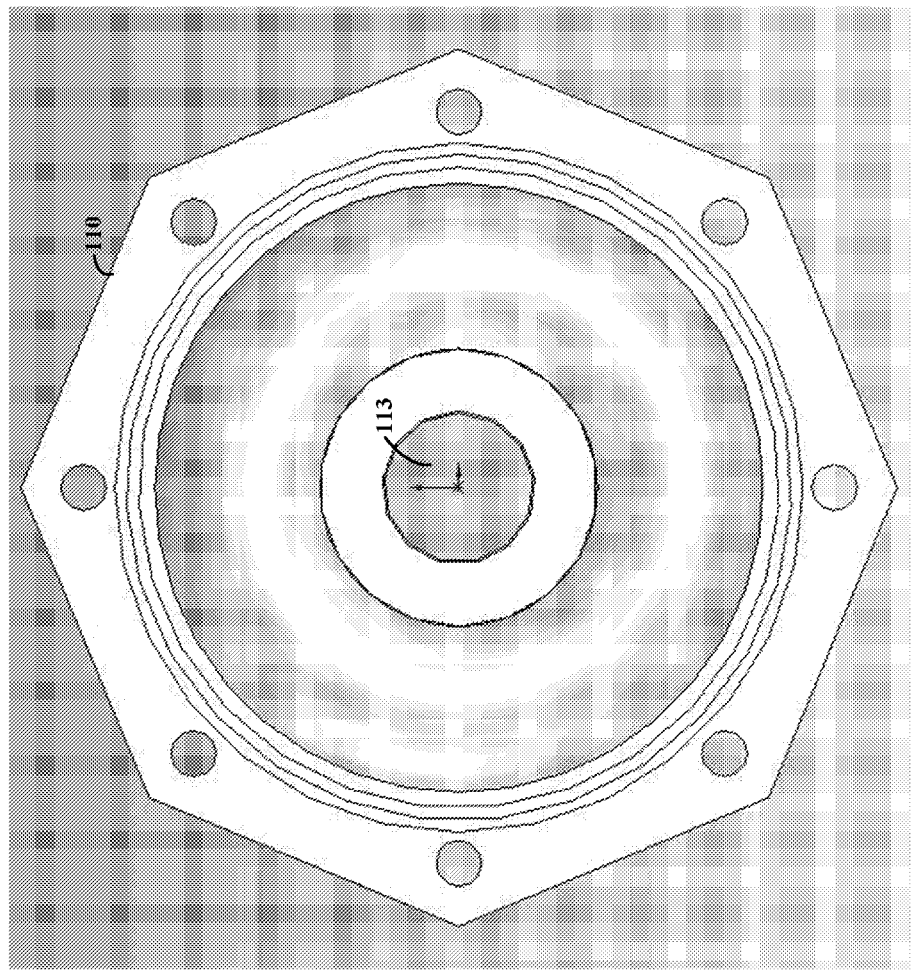
FIG. 1B shows the cut-away view of the half of a clam-shell type housing shown in FIG. 1A, as may be implemented in accordance with an example embodiment.

FIG. 1B shows the cut-away view of the half of a clam-shell type housing 110 shown in FIG. 1A, as may be implemented in accordance with an example embodiment. The housing 110 includes a central opening 113 via which one of the shafts may protrude, and which can be coupled to the housing with an interface that permits containment of pressure within the housing as characterized herein. For instance, extensions may be added to each piston lobe, which sit against the central shaft/interface and stop airflow from passing in the space between the lobe and the center assembly during rotation. This extension may also be implemented to prevent the lobe from shifting during the track around the center during a compression and expansion cycle.

In the following discussion, various piston lobes, shafts, housings and related assemblies are characterized. Various ones of these may be implemented in accordance with the above discussion, such as with piston lobes that form respective sub-chambers within a toroid-based housing, and with each other.

In another embodiment, an apparatus includes respective piston lobes within a housing and coupled to a drive shaft around which the housing lies. The housing defines a sidewall of a chamber having inlet and exhaust ports. The piston lobes operate to rotate circumferentially through the housing, with a first one of the piston lobes being connected to the drive shaft (e.g., as in a direct-drive arrangement) and a second one of the piston lobes being coupled to the drive shaft by a clutch bearing. The second piston lobe rotates independently of the drive shaft, with the clutch bearing limiting rotation of the second piston lobe to a common direction of rotation of the drive shaft. In this context, the second piston lobe acts as a fixable portion of an expansion and/or combustion chamber in which gas pressure drives the first piston lobe and, therein, the drive shaft. Various such embodiments may be implemented with the apparatus 100 with, for example, piston lobes 120 and 121 connected in a direct-drive format to a central drive shaft, and piston lobes 130 and 131 coupled to the shaft by a clutch bearing.

Figure 2A:
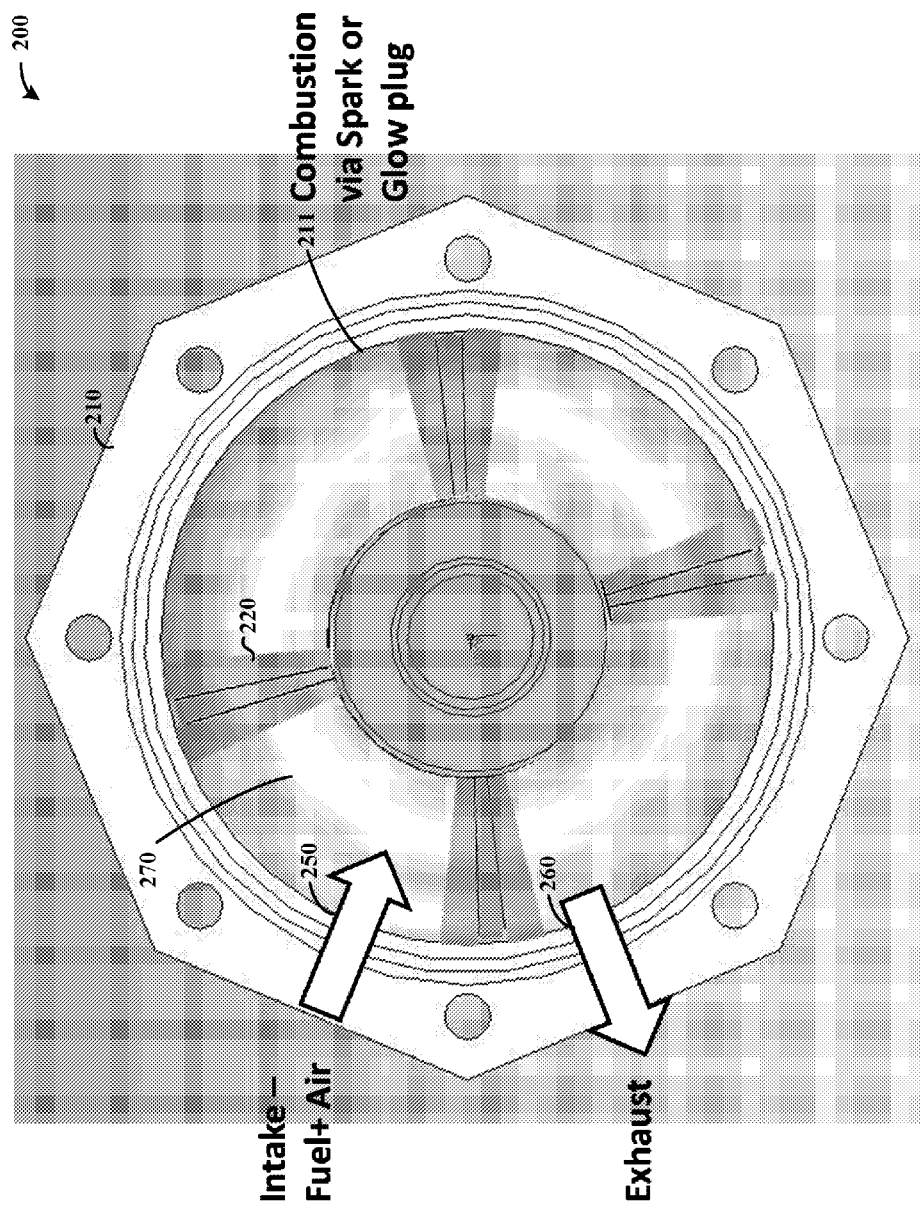
FIG. 2A shows a cut-away view of an engine apparatus with an intake stage, in accordance with an example embodiment.

FIG. 2A shows a cut-away view of an engine apparatus 200 with an intake stage, in accordance with an example embodiment. The apparatus 200 includes a housing 210, with respective pairs of piston lobes coupled to a common shaft at opposite (180 degree) locations. Combustion can be provided via a spark or glow plug located in a sidewall of the housing 210 at 211, or in one of the piston lobes defining respective sub-chambers (e.g., at 220). An intake port at 250 provides an intake fuel/air mixture into sub-chamber 270, and an exhaust port at 260 exhausts combustion products at 260.

Figure 2B:
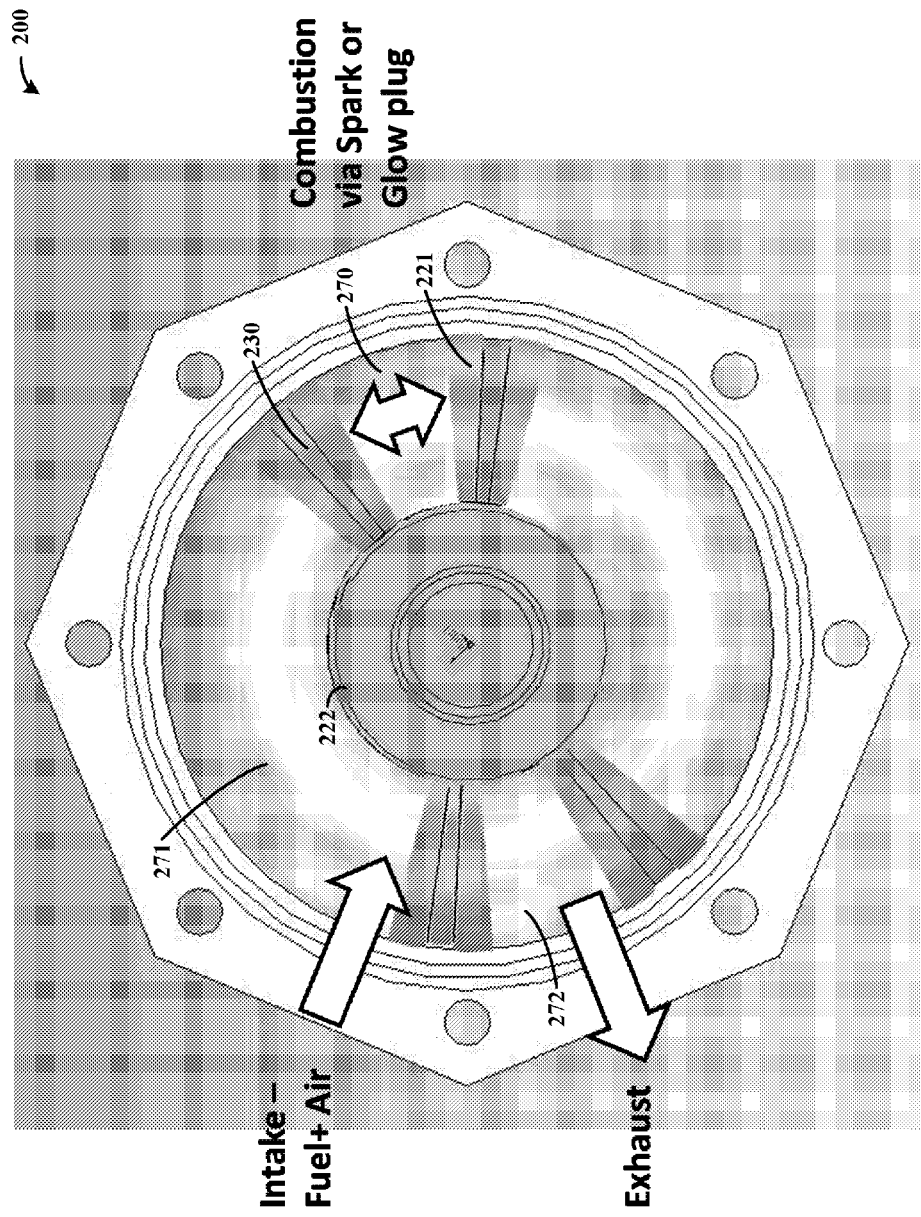
FIG. 2B shows the cut-away view of FIG. 2A at an ignition stage, in accordance with an example embodiment.

FIG. 2B shows the cut-away view of FIG. 2A at an ignition stage, in accordance with an example embodiment. The fuel/air mixture in sub-chamber 270 has been compressed between respective piston lobes as the sub-chamber moves clockwise within the housing, and can be ignited thereat. Piston 230 is prevented from moving counter-clockwise using a clutch bearing (e.g., separate from and/or integrated with shaft assembly 222), such that gas expanding in sub-chamber 270 via the combustion drives piston 221 clockwise. During this stage, additional fuel/air may continue to be drawn into a sub-chamber 271 trailing the sub-chamber 270 while combustion products are exhausted from sub-chamber 272. Fuels such as propane, gasoline, diesel and hydrogen can be used in this context.

Figure 3:
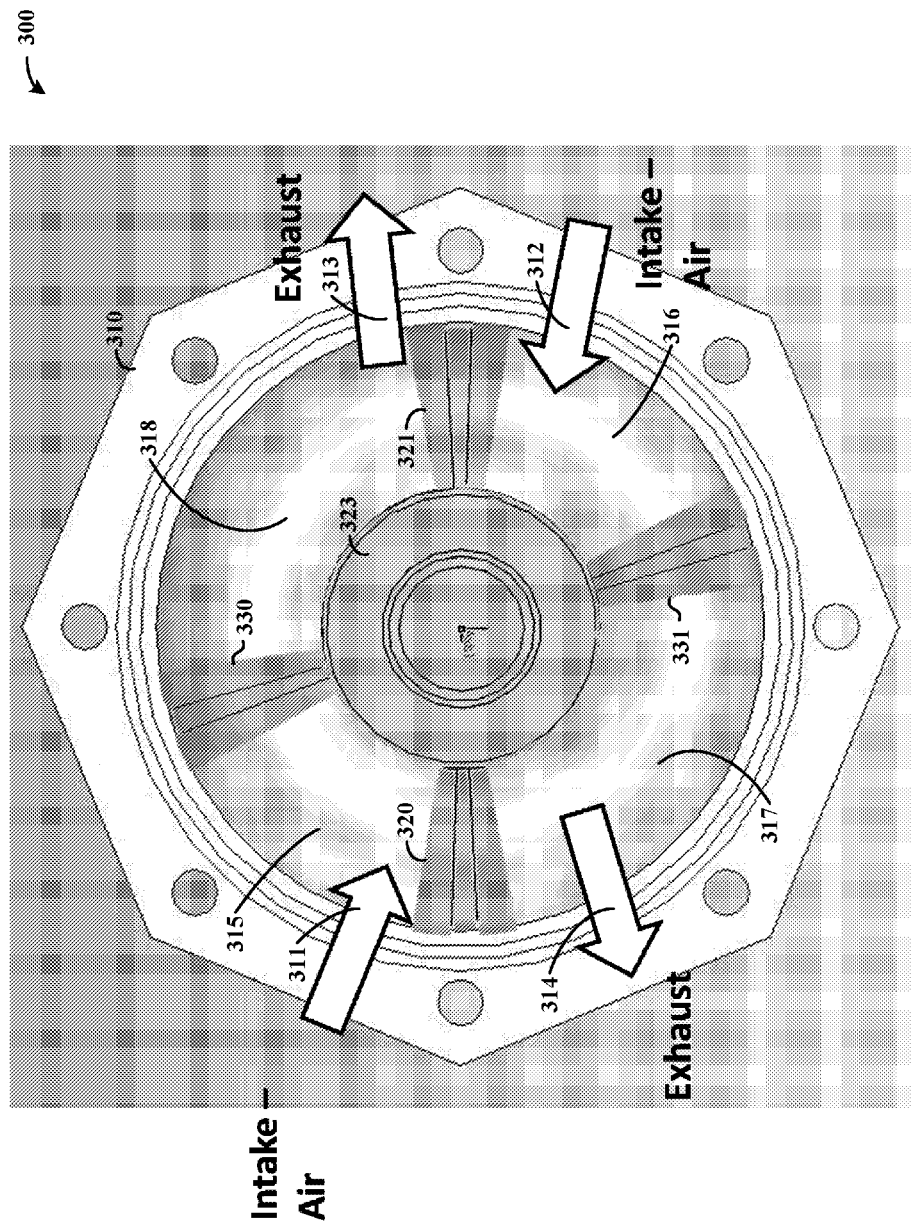
FIG. 3 shows a cut-away view of a motor with dual intake/exhaust ports, in accordance with an example embodiment.

FIG. 3 shows a cut-away view of a motor apparatus 300 with dual intake/exhaust ports, in accordance with an example embodiment. The motor apparatus 300 has a housing 310 with respective intake ports at 311 and 312, and respective exhaust ports at 313 and 314. Piston lobe pairs 320 and 321 are connected to a first shaft assembly 323, and piston lobe pairs 330 and 331 are connected to a second shaft assembly (behind first shaft assembly 323). As pressurized and/or expanding gas (e.g., PURON or r-134) is brought into sub-chambers 315 and 316, piston lobes 330 and 331 are driven clockwise while piston lobes 320 and 321 are prevented from moving counter-clockwise using clutch bearings or other mechanical components coupled to/with the shaft assembly to which they are connected. Gas is exhausted from the other sub-chambers 317 and 318 as shown. As the piston lobes continue to move clockwise, the sub-chambers 317 and 318 transition into an intake stage via ports 311 and 312, with the gas having been brought into sub-chambers 315 and 316 being exhausted via ports 313 and 314. Pressure/torque can be balanced via the two intake ports and two exhaust ports as positioned equidistant and balanced in pressure, which can mitigate the application of unbalanced stress that can cause friction and binding. The intake and exhaust ports may, for example, be implemented at a junction of a clamshell housing that is joined by welding or another approach. In certain embodiments, the intake port 312 and exhaust port 314 are omitted.

Figure 4:
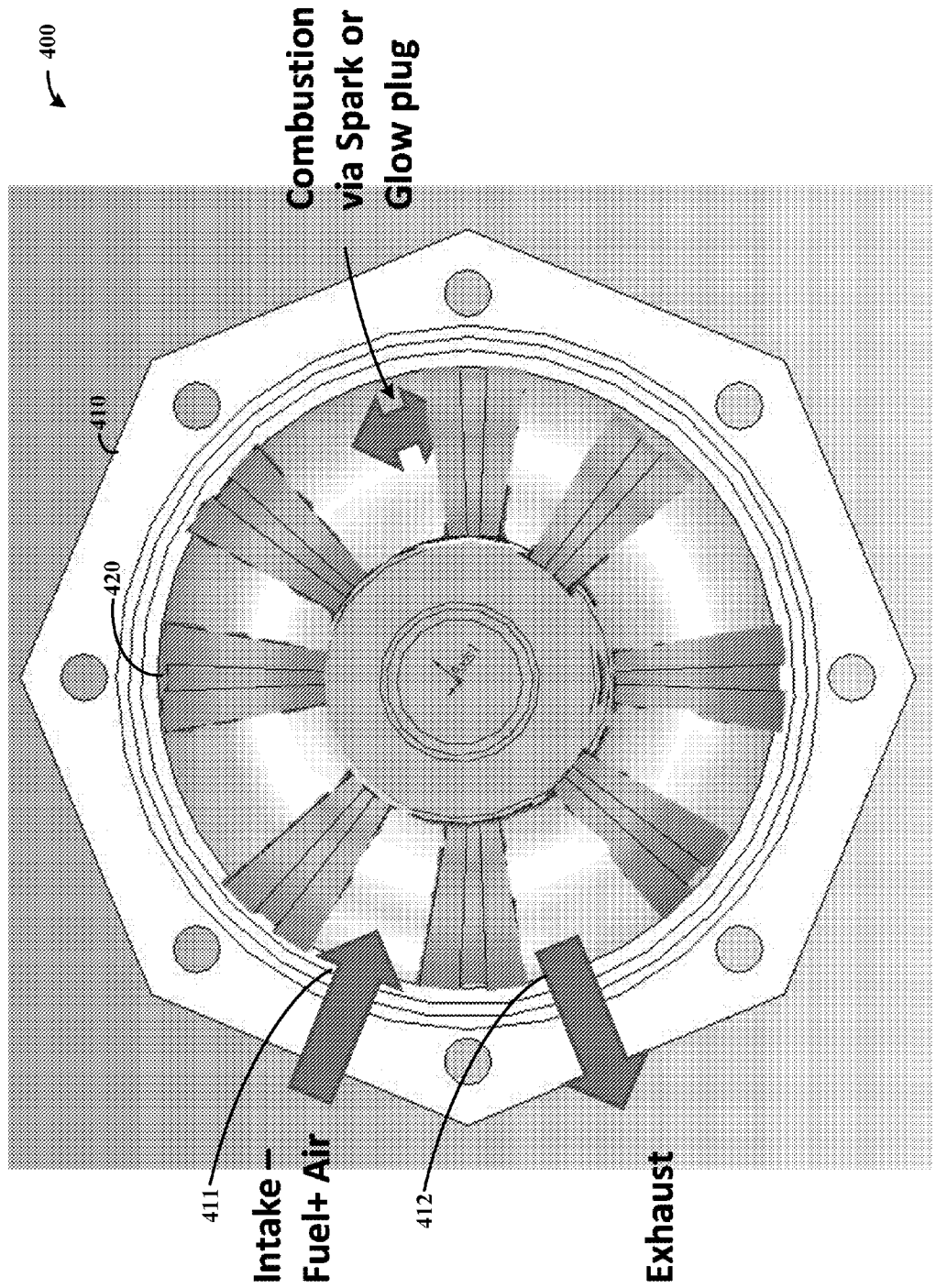
FIG. 4 shows a cut-away view of an engine with multiple piston lobes, in accordance with an example embodiment.

FIG. 4 shows a cut-away view of an engine 400 with multiple piston lobes, in accordance with an example embodiment. The engine 400 includes housing 410, with intake port 411 and exhaust port 412. Different ones of the piston lobes (with lobe 420 labeled by way of example) may be coupled to common or different shafts. Accordingly, various numbers of piston lobes may be implemented to suit particular embodiments. For instance, various embodiments involve more than two piston lobes coupled to a drive shaft, such as with three piston lobes coupled at 120 degrees relative to one another, about the drive shaft.

Figure 5:
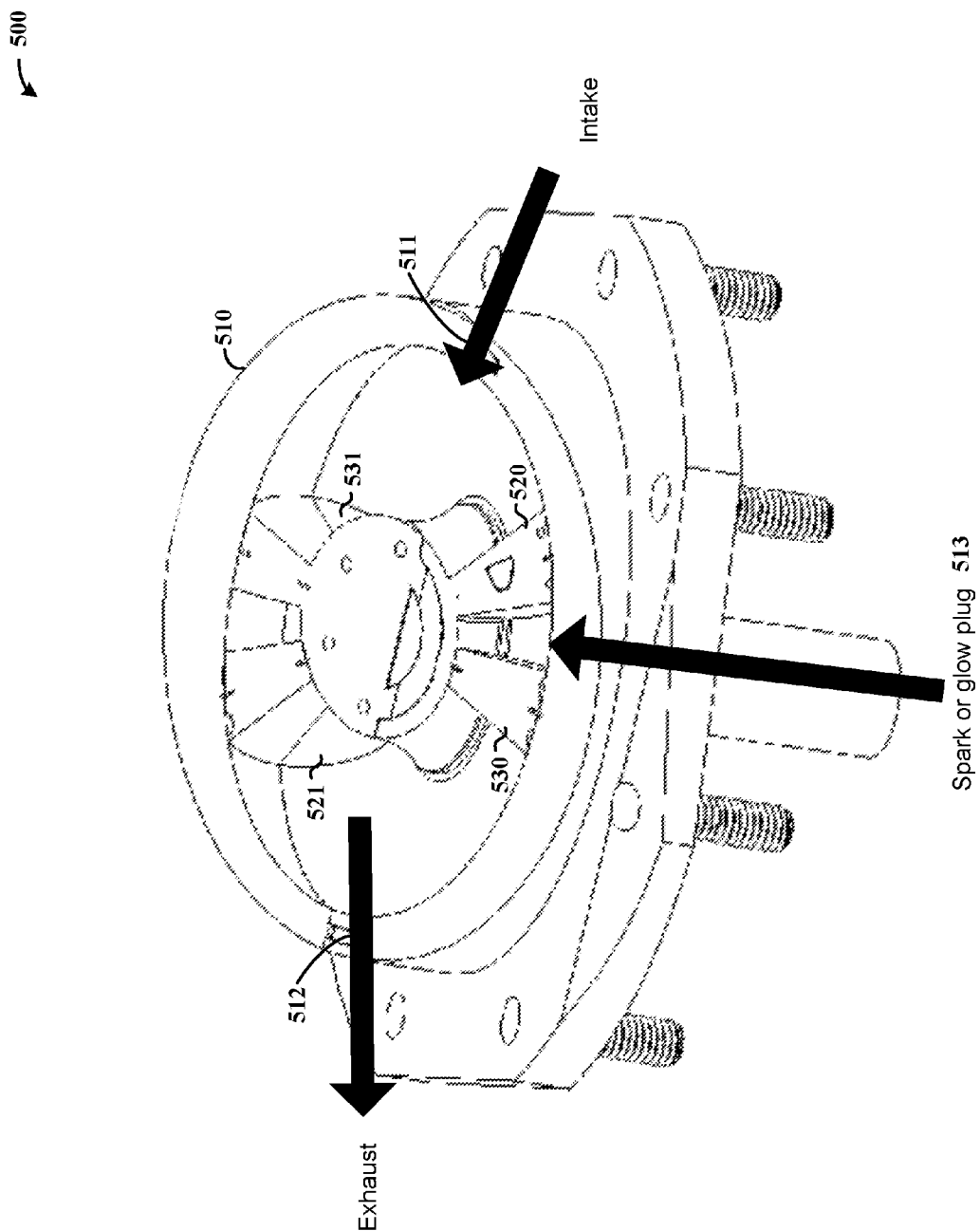
FIG. 5 shows a cut-away view of an engine, in accordance with an example embodiment.

FIG. 5 shows a partial cut-away view of an engine apparatus 500, in accordance with an example embodiment. Housing 510 provides combustion chambers between leading and trailing surfaces of piston lobes, including lobes 520, 521 and 530, 531. Fuel/air is brought in via intake port 511, and combustion products are exhausted at exhaust port 512. A spark or glow plug is implemented at 513, where fuel/air have been compressed between piston lobes 520 and 530.

Figure 6:
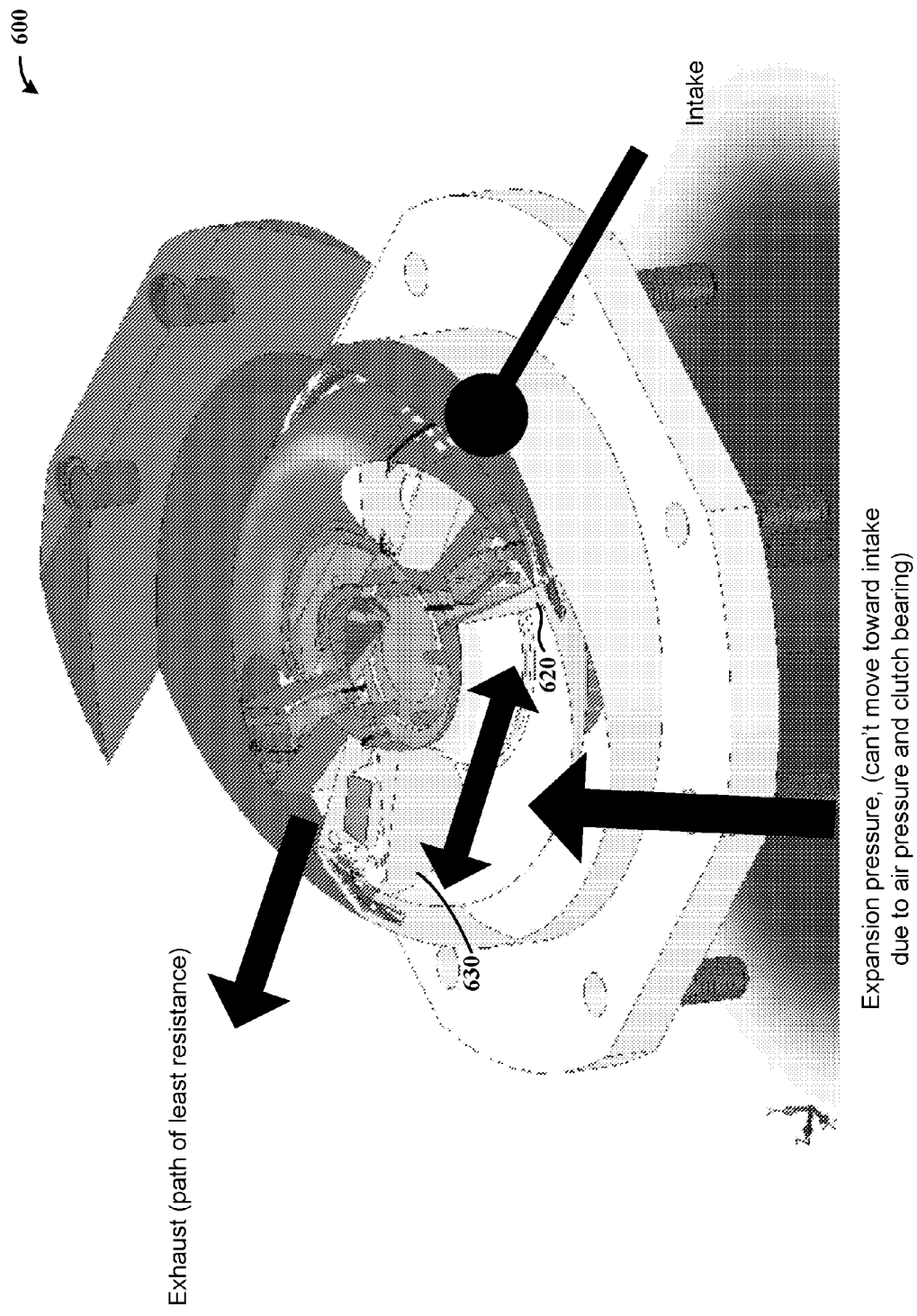
FIG. 6 shows a partial cut-away view of a motor/engine, in accordance with an example embodiment.

FIG. 6 shows a partial cut-away view of a motor/engine apparatus 600, in accordance with an example embodiment. The apparatus 600 may, for example, be implemented in accordance with the apparatus 500 shown in FIG. 5 with piston lobe 630 having been driven away from piston lobe 620 by expanding combustion gasses, with piston lobe 620 being prevented from moving counter-clockwise via a clutch bearing or other componentry.

Figure 7:
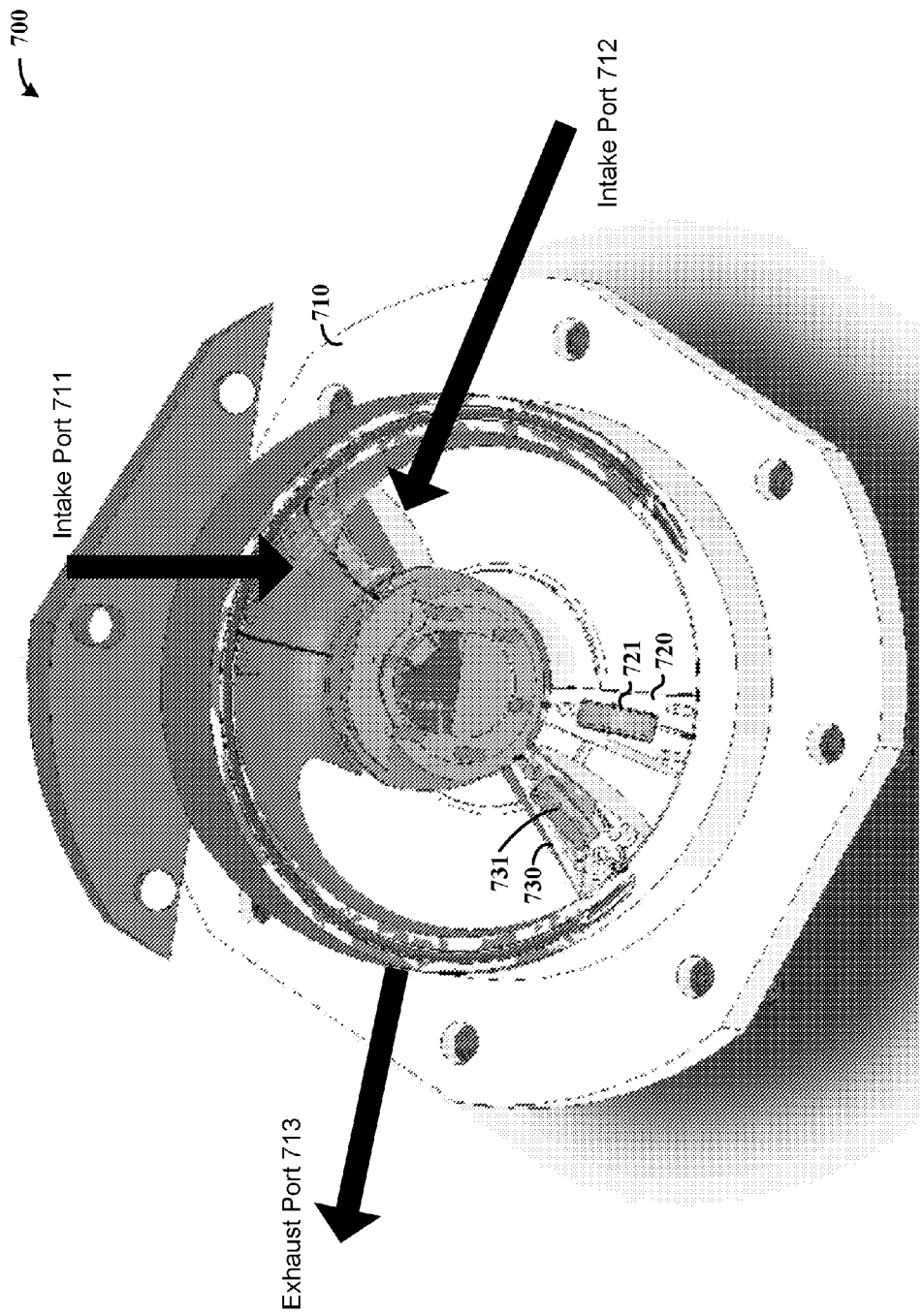
FIG. 7 shows another partial cut-away view of a motor/engine with separate intakes, in accordance with an example embodiment.

FIG. 7 shows another partial cut-away view of a motor/engine apparatus 700 with separate intakes, in accordance with an example embodiment. Housing 710 includes intake ports 711 and 712, and exhaust port 713. The separate intakes may, for example, be used to intake pressurized gas at respective stages for each sub-chamber defined by leading/trailing surfaces of piston lobes.

In some implementations, piston lobes characterized herein include magnets and/or magnetic material. By way of example, FIG. 7 is shown with piston lobes 720 and 730 respectively including magnets 721 and 731, as represented in the cut-away view. The magnets inside the piston lobes are set to repel when the piston lobes get close enough for the magnetic repulsion to occur. This causes the piston lobe 730 to move clockwise relative to piston lobe 720.

Figure 8:
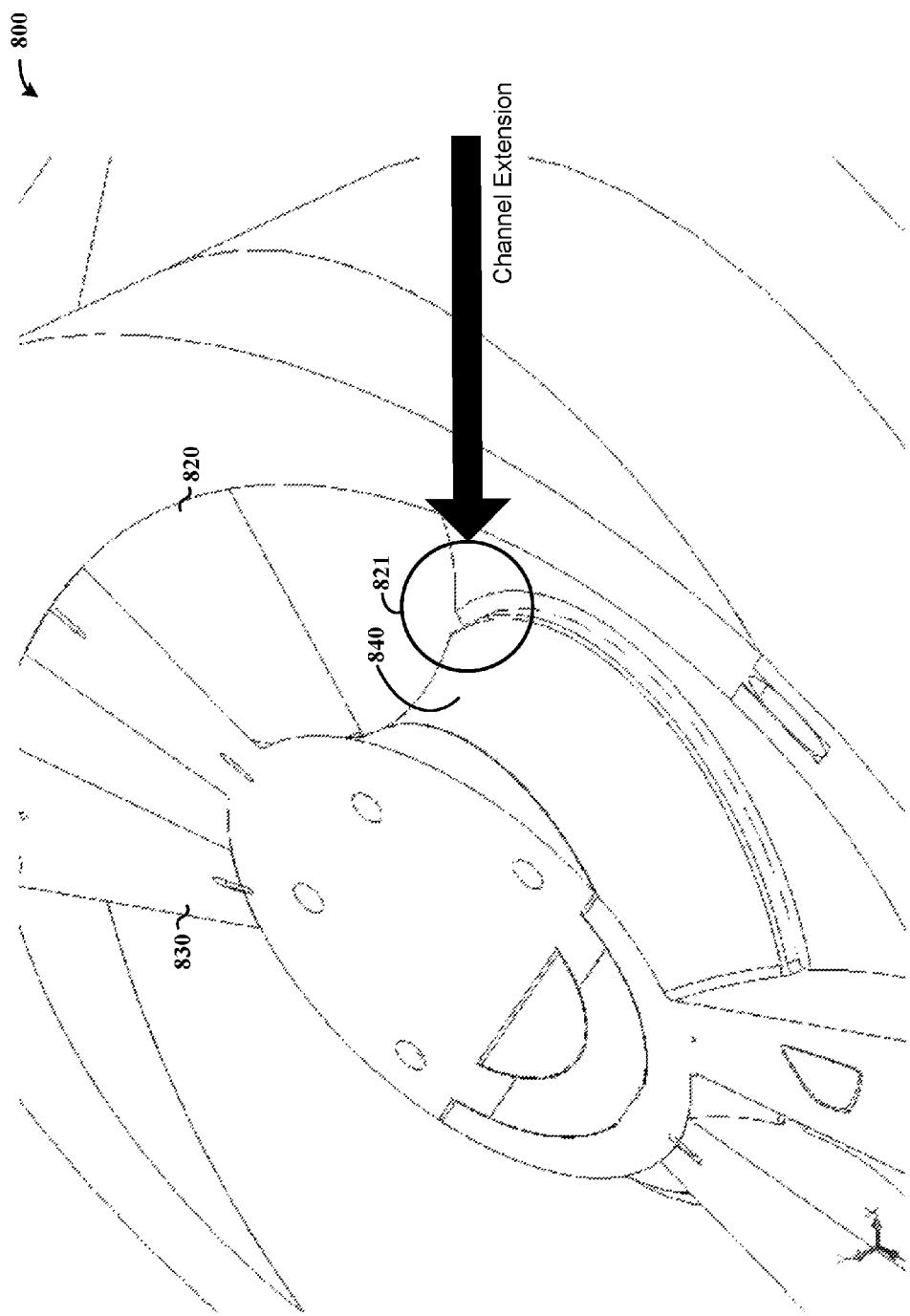
FIG. 8 shows a cut-away view of a piston lobe assembly, in accordance with an example embodiment.

FIG. 8 shows a cut-away view of a piston lobe assembly 800, in accordance with an example embodiment. Respective piston lobes including lobes 820 and 830 are coupled to a central shaft assembly having a surface 840 that bounds a combustion sub-chamber defined by the housing 810 and respective leading/trailing surfaces of the piston lobes. A channel extension 821 is provided with each piston lobe to facilitate sealing of the sub-chambers.

Figure 9:
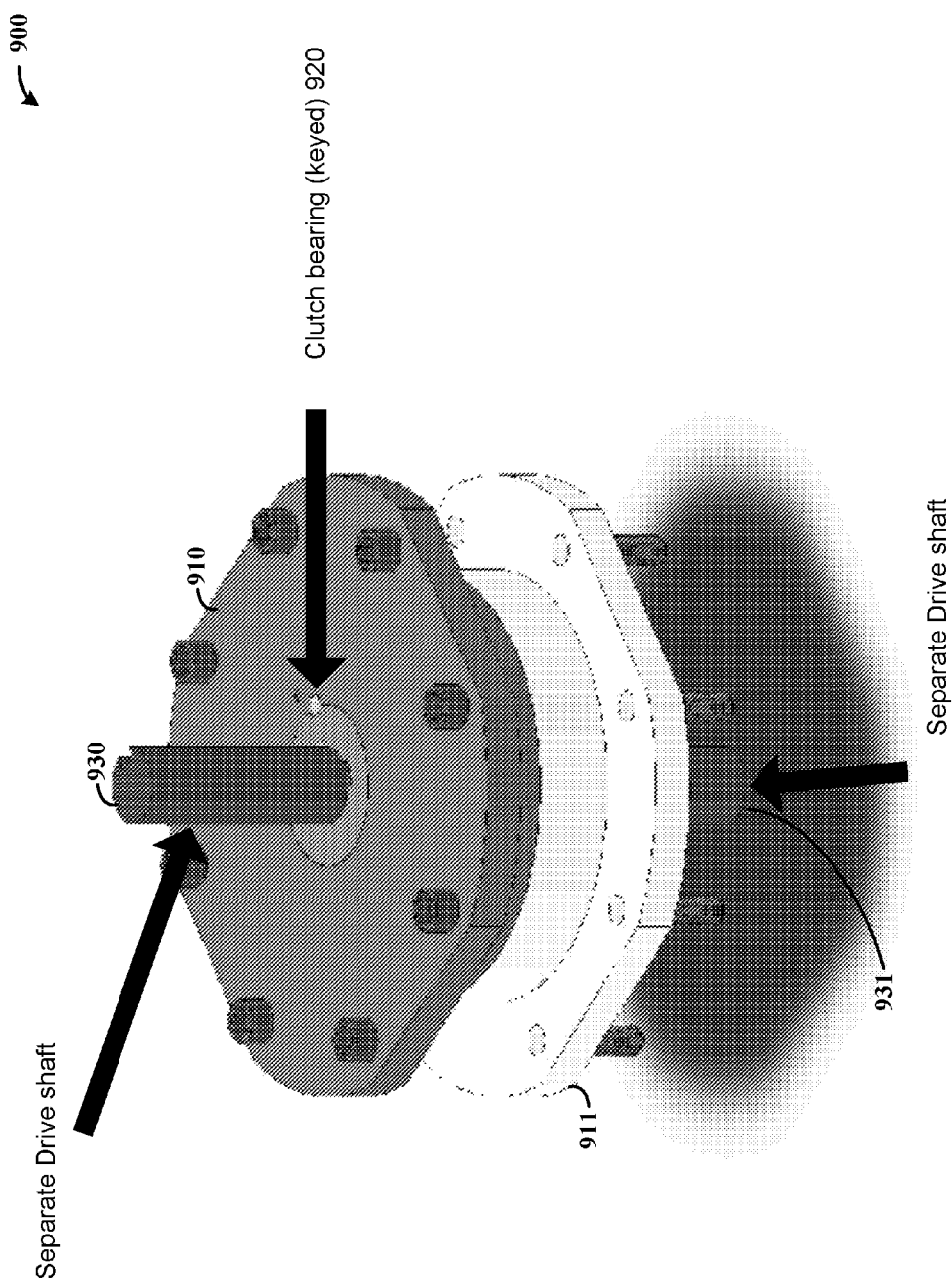
FIG. 9 shows an external view of a motor/engine, in accordance with an example embodiment.

FIG. 9 shows an external view of a motor/engine apparatus 900, in accordance with an example embodiment. Two halves 910 and 911 of a clam-shell type housing are shown coupled to one another via fasteners, with portions of the fasteners removed for clarity. Each housing half has a clutch bearing and shaft, including clutch bearing 920 and shafts 930 and 931. The clutch bearing 920 is keyed into the housing 910, and shaft 930 is keyed into the clutch bearing. These aspects permit separate rotation of the shafts along with piston lobes connected to each respective shaft within the housing. As such, one or both shafts can be connected to provide power, such as to a generator or other component.

Figure 10:
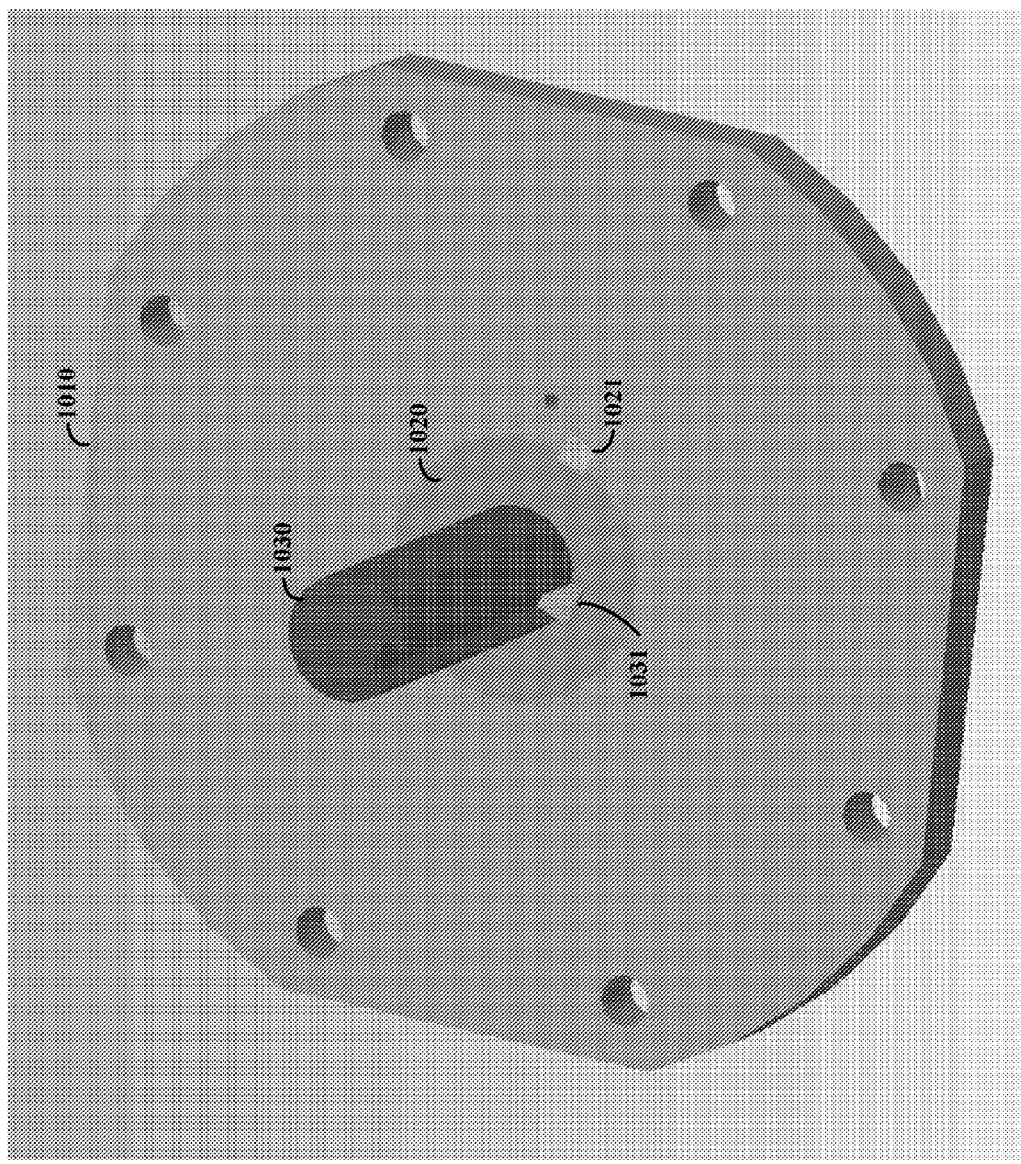
FIG. 10 shows an engine housing with keyed shaft and bearing connections, in accordance with an example embodiment.

FIG. 10 shows an engine housing apparatus 1000 with keyed shaft and bearing connections, in accordance with an example embodiment. The apparatus 1000 may, for example, be implemented with apparatus 900 shown in FIG. 9. Clutch bearing 1020 is locked to housing 1010 by a key 1021. Shaft 1030 is locked to clutch bearing 1020 via key 1031.

Figure 11:
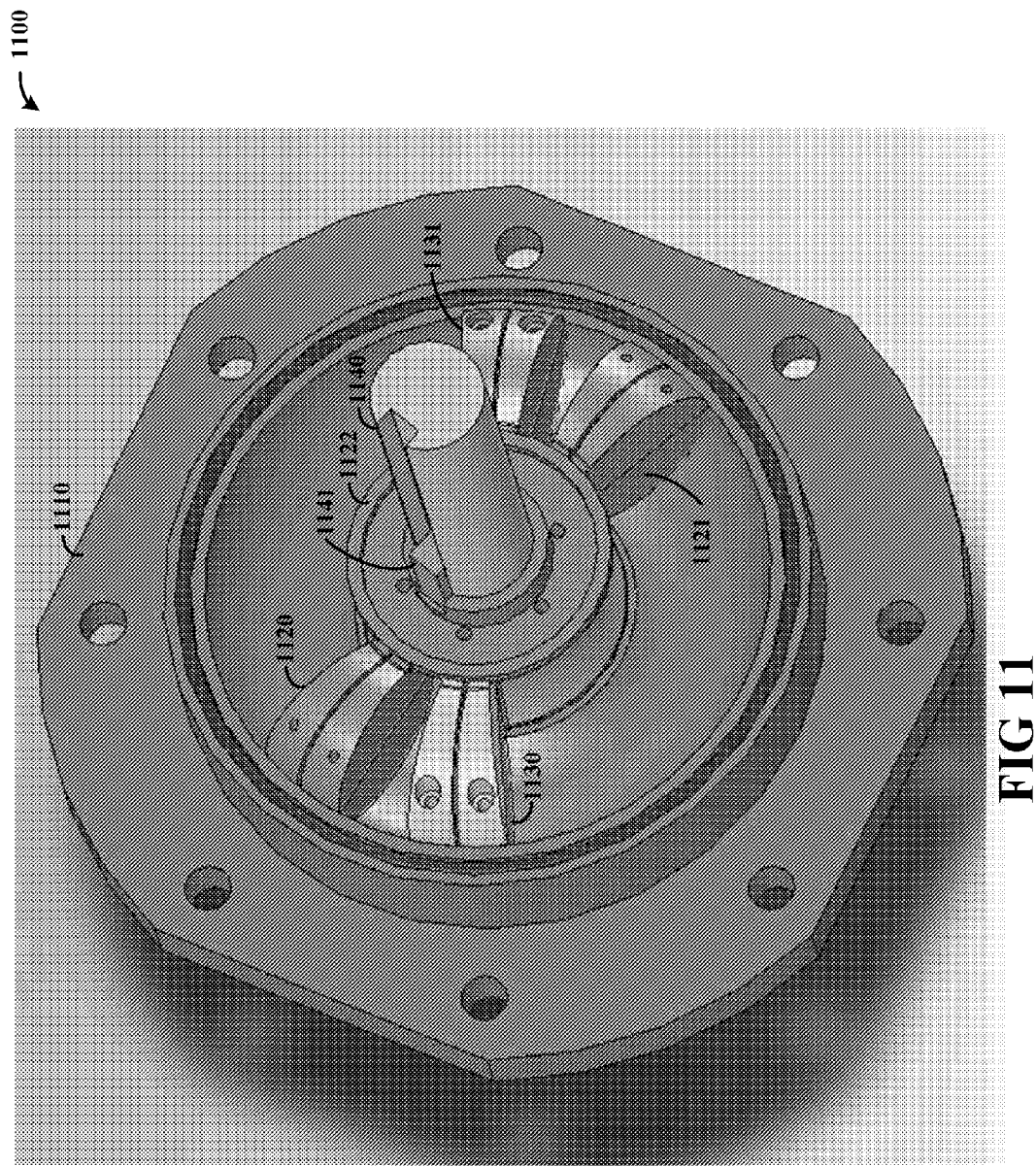
FIG. 11 shows a cut-away view of half of a clam-shell type housing with respective pairs of piston lobes coupled to different shafts with a keyed arrangement, in accordance with an example embodiment.

FIG. 11 shows a cut-away view of an apparatus 1100 having a half of a clam-shell type housing 1110 with respective pairs of piston lobes (1120/1121 and 1130/1131) coupled to different shafts with a keyed arrangement, in accordance with an example embodiment. Shaft 1140 is shown coupled via key 1141 to the piston lobes 1120 and 1121 via component 1122.

Figure 12:
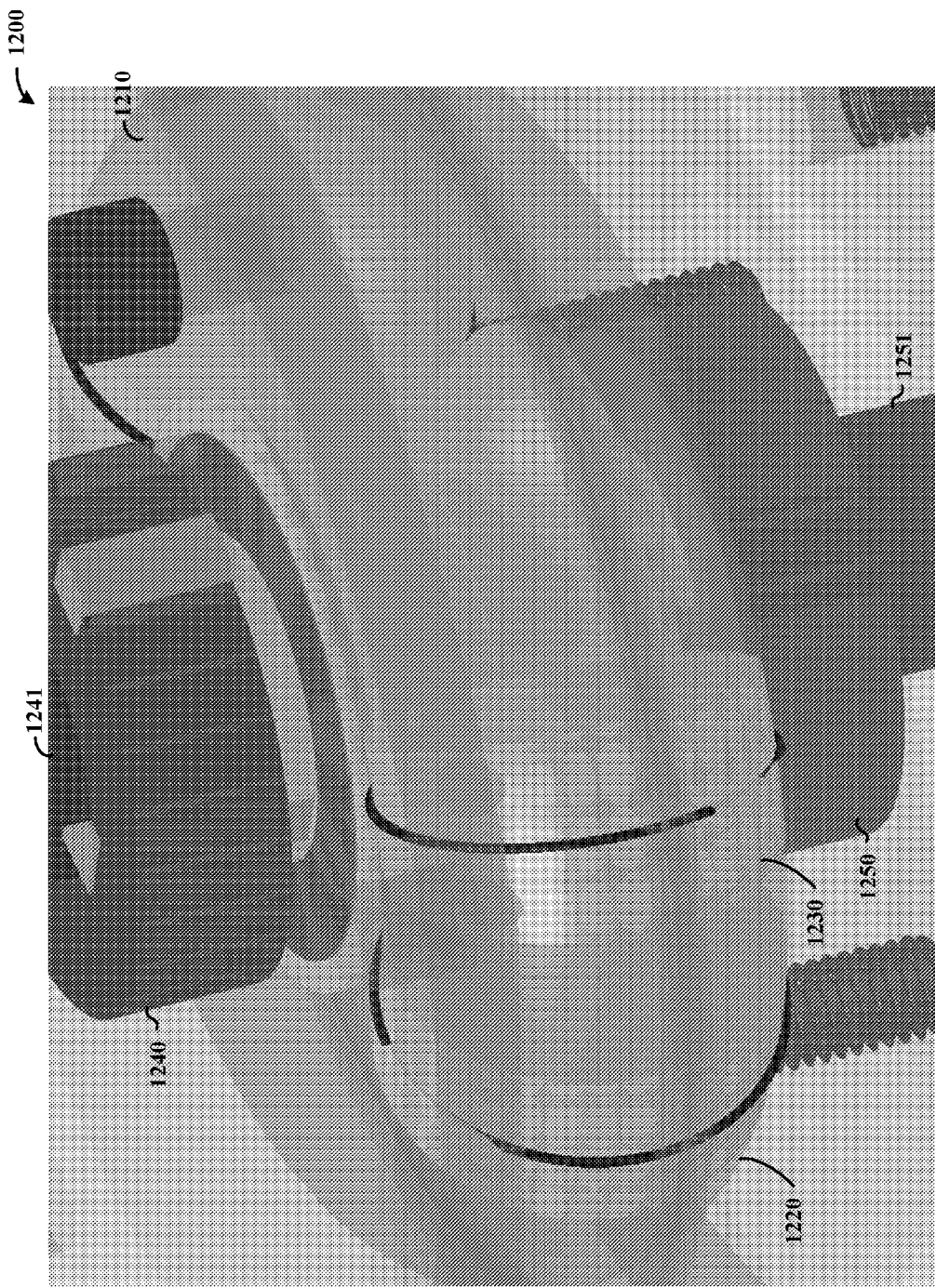
FIG. 12 shows a three dimensional view of piston lobes within a housing and respective shafts coupled for each piston lobe, in accordance with another example embodiment.

FIG. 12 shows a three dimensional view with partial transparency for an apparatus 1200 having piston lobes within a toroid-shaped housing 1210 and respective shafts coupled for each piston lobe, in accordance with another example embodiment. By way of example, piston lobes 1220 and 1230 are shown, which are respectively coupled to different shafts 1241 and 1251 passing into a central region of the toroid-shaped housing 1210. Clutch bearing 1240 is coupled to shaft 1241, and clutch bearing 1250 is coupled to shaft 1251.

Figure 13:
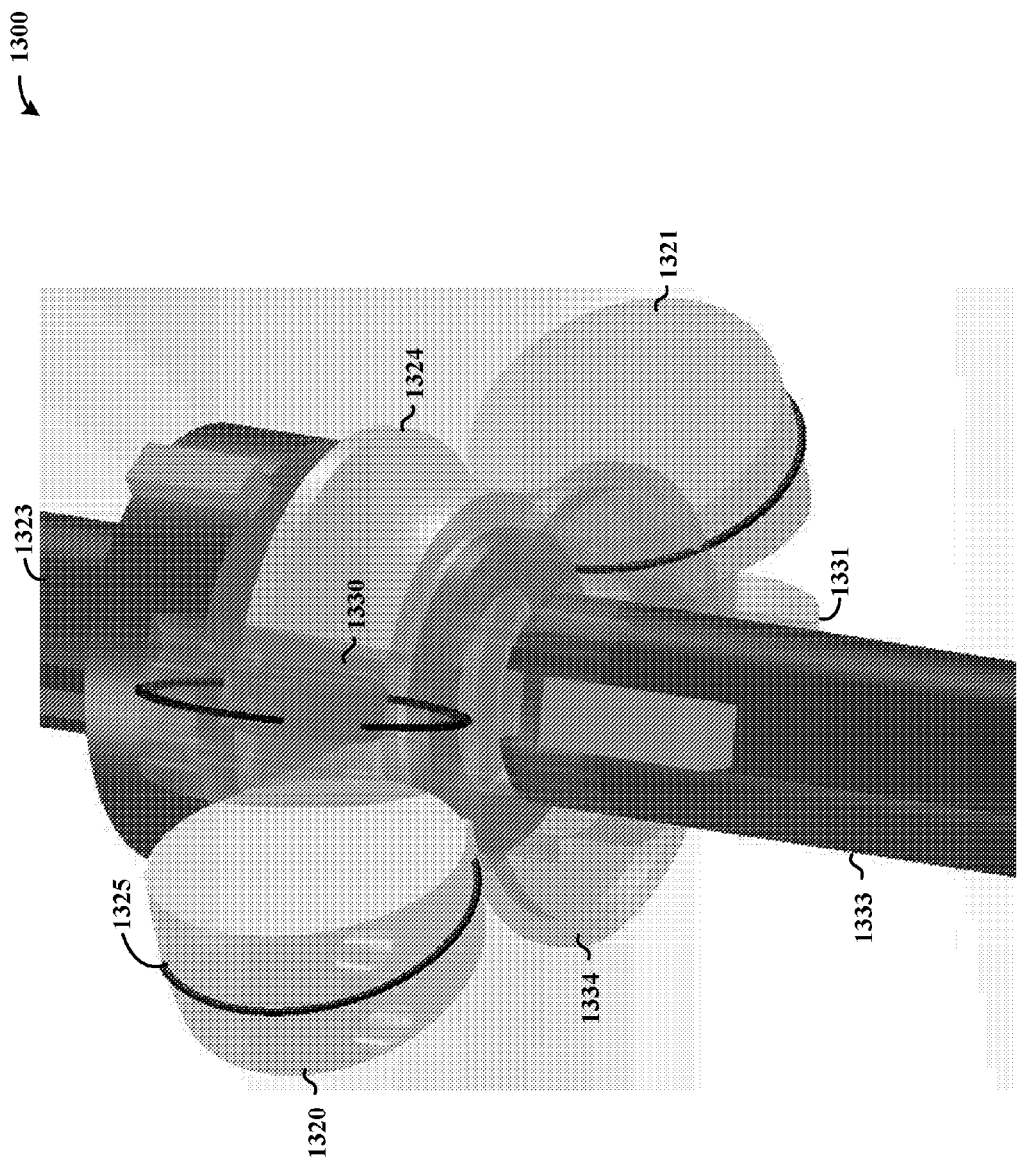
FIG. 13 shows respective pairs of piston lobes, each coupled to a different shaft and with respective interior/central shaft interfaces that bound a combustion chamber, in accordance with another embodiment.

FIG. 13 shows an apparatus 1300 having respective pairs of piston lobes, each coupled to a different shaft and with respective interior/central shaft interfaces that may be implemented to bind a combustion chamber, in accordance with another embodiment. Piston lobe 1320 and 1321 are connected to shaft 1323 at a central portion 1324. Shown with transparency, piston lobes 1330 and 1331 are connected to shaft 1333 at a central portion 1334. These central portions 1324 and 1334 may combine to provide an inner surface of a toroidal-based chamber as shown with other drawings herein. Each piston lobe may be implemented with a ring-type structure as shown at 1325, which may extend partially and/or all around each piston lobe and form a seal with a housing in which the piston lobe rotates.

Figure 14:
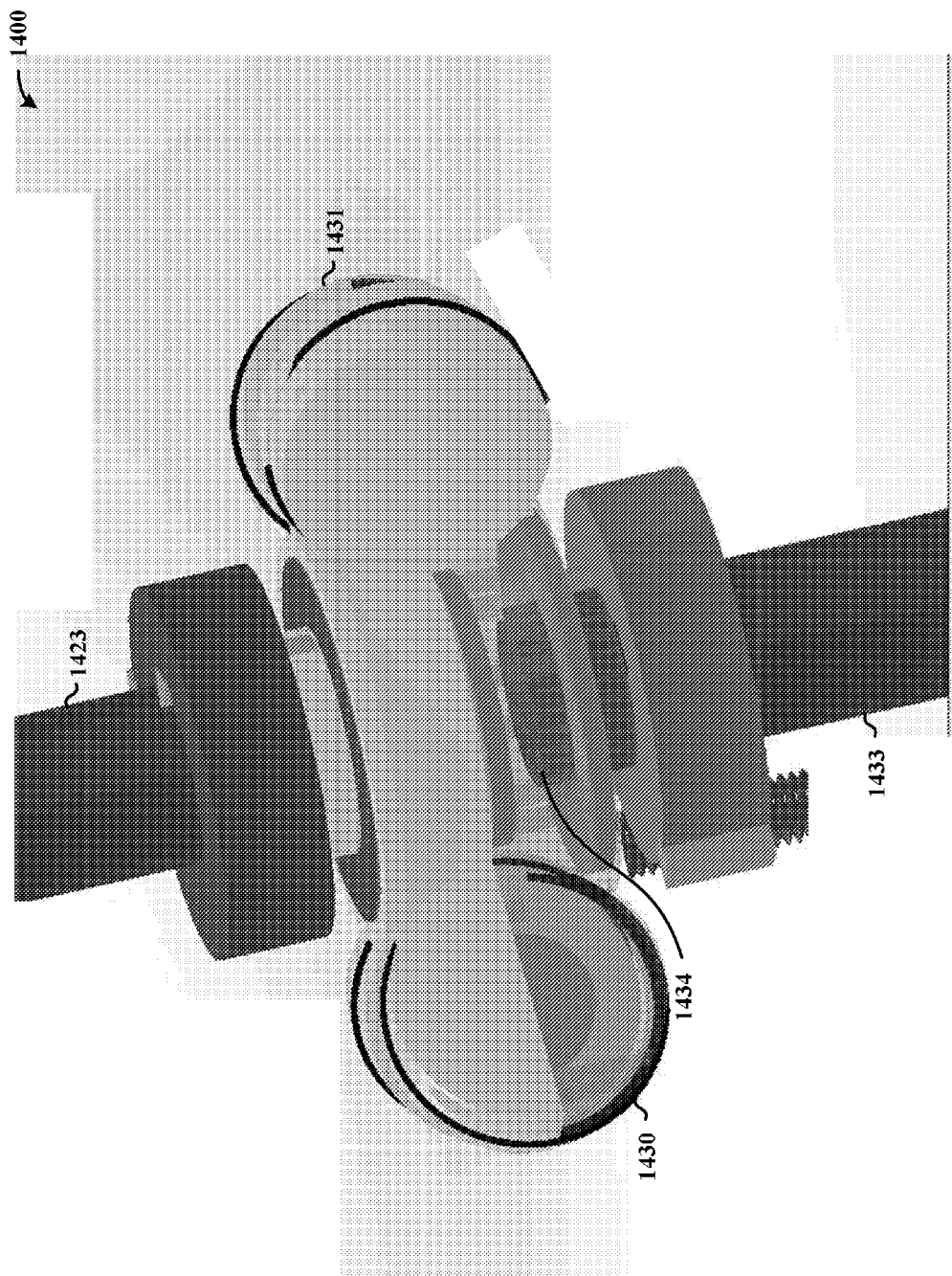
FIG. 14 shows a cut-away view of piston lobes with coupling to respective shafts, in accordance with another embodiment.
Figure 15:
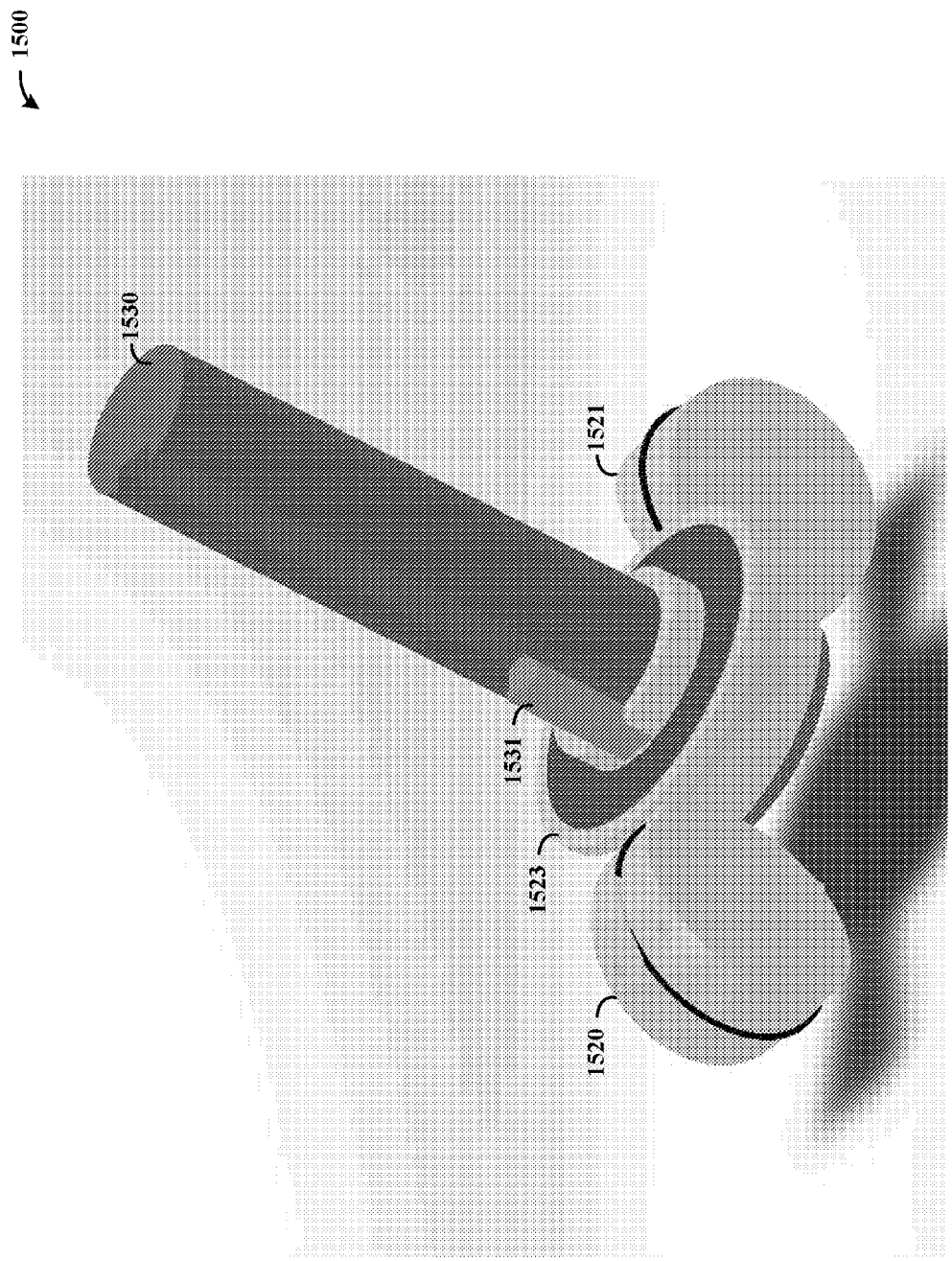
FIG. 15 shows a single piston lobe/shaft assembly, in accordance with another embodiment.

FIG. 14 shows a cut-away view of an apparatus 1400 having piston lobes with coupling to respective shafts 1423 and 1433, in accordance with another embodiment. Aspects of the apparatus 1400 have been removed or are shown with transparency. An upper end of shaft 1433 terminates at end 1434, which is directly connected to a par of the piston lobes FIG. 15 shows an apparatus 1500 including a single piston lobe/shaft assembly, in accordance with another embodiment. The apparatus 1500 may be implemented with one or more apparatuses as characterized herein, such as with a piston lobe pair implemented in housings shown herein. The assembly includes piston lobes 1520 and 1521 connected to shaft 1530 via an interface/central portion 1523 and key 1531. As such, the piston lobes 1520 and 1521 are directly connected to and rotate with shaft 1530 in a direct-drive arrangement.

Based upon the above discussion and illustrations, those skilled in the art will readily recognize that various modifications and changes may be made to the various embodiments without strictly following the exemplary embodiments and applications illustrated and described herein. For example, additional piston lobes may be added, or piston lobes as shown may be removed. Embodiments shown as engines can be implemented with a motor, and vice-versa. Various the drive shaft or shafts can be coupled with further componentry, with embodiments being directed to larger systems employing those aspects as shown (e.g., including an air conditioning system that provides gas that drives the piston lobes, as well as a generator coupled to one or more of the drive shafts). In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
  first and second drive shafts having a common axis of rotation, each drive shaft being configured and arranged to rotate independently of the other drive shaft;
  a housing around the drive shafts, the housing defining a sidewall of a chamber having inlet and exhaust ports; and
  for each drive shaft,
    a respective clutch bearing connected to the drive shaft and configured and arranged to limit rotation of the drive shaft to a rotational direction that is the same for both drive shafts, and
    at least one piston lobe connected to the drive shaft, each piston lobe disposed within the chamber and configured and arranged to move circumferentially within the chamber and about the axis of rotation with the drive shaft, each piston lobe having a magnet, the magnets of adjacent ones of the piston lobes having polarities that provide a magnetic field that generates a magnetic force in a direction that acts to repel the adjacent ones of the piston lobes away from one another.

2. The apparatus of claim 1, wherein a leading surface of each piston lobe forms an enclosed portion of the chamber bound by the leading surface, an interior surface of the chamber and a trailing surface of one of the piston lobes connected to the other drive shaft.

3. The apparatus of claim 2, wherein each shaft and the piston lobes connected thereto are configured and arranged to, in response to gas pressure within one of the enclosed portions of the chamber via gas provided through the inlet port, rotate the shaft utilizing the gas pressure on the trailing surface of one of the piston lobes while utilizing the clutch bearing to prevent rotation of the other shaft in the opposite rotational direction.

4. The apparatus of claim 1, wherein each shaft and the piston lobes connected thereto are configured and arranged to rotate in response to gas pressure upon on a trailing surface of one of the piston lobes while the clutch bearing prevents rotation of the other shaft in response to force applied by the gas pressure upon a leading surface of one of the piston lobes connected to the other shaft, the leading surface facing the rotational direction and the trailing surface facing opposite the rotational direction.

5. The apparatus of claim 1, wherein the piston lobes are arranged circumferentially around the shafts and equidistant from the axis of rotation, and have a seal around an outer sidewall thereof that interfaces with an inner sidewall of the chamber and therein separate portions of the chamber respectively bound by the leading and trailing surfaces of the lobe.

6. The apparatus of claim 1, wherein the piston lobes, drive shafts, chamber and clutch bearing are configured and arranged to:
draw gas in through the inlet port,
contain the gas within a portion of the chamber bound by sidewalls of the chamber and respective leading and trailing surfaces of adjacent ones of the piston lobes while utilizing expansion of the gas to drive the piston lobe having the trailing surface that bounds the portion of the chamber, and
upon rotation of the driven piston lobe past the exhaust port, exhaust the expanded gas from the chamber.

7. The apparatus of claim 1, wherein the at least one piston lobe includes a pair of piston lobes connected to the drive shaft, the pair of piston lobes extending in opposite directions relative to the drive shaft and counter-balancing one another.

8. The apparatus of claim 1, further including, for each piston lobe, a counter balance connected to the same drive shaft that the piston lobe is connected to and configured and arranged to counter balance the piston lobe relative to the axis of rotation.

9. The apparatus of claim 1, wherein the chamber and the piston lobes are circumferentially-arranged about the axis of rotation, with the sidewall and piston lobes exhibiting a sliding interface about sidewalls of the piston lobes via which the piston lobes separate the chamber into sub-chambers, the sub-chambers being bound by the sidewalls and respective leading and trailing surfaces of adjacent piston lobes.

10. The apparatus of claim 1, wherein the chamber has a toroidal-based shape and the piston lobes provide sub-chambers within the chamber, each sub-chamber being bound by a portion of the sidewall of the chamber and respective leading and trailing surfaces of circumferentially-adjacent ones of the piston lobes.

11. The apparatus of claim 10,
further including an ignition source, and
wherein the piston lobes, drive shafts and housing are configured and arranged with the ignition source to carry out a fuel combustion cycle by, for one of the sub-chambers:
in a fuel intake stage, receive fuel into the sub-chamber via the inlet port with the leading and trailing surfaces of the adjacent ones of the piston lobes engaged with the sidewall on opposite sides of the inlet port;
in a fuel combustion stage, provide a sealed combustion chamber between the sidewall and the leading and trailing surfaces that define the sealed combustion chamber, ignite the fuel in the sealed combustion chamber via the ignition source, and utilize the ignited fuel to drive the shaft connected to the piston lobe having the trailing surface that defines the combustion chamber by applying pressure from the ignited fuel upon the trailing surface; and
in an exhaust stage, exhaust gas generated by the ignited fuel via the exhaust port, with the leading and trailing surfaces of the adjacent ones of the piston lobes engaged with the sidewall on opposite sides of the exhaust port.

12. The apparatus of claim 1,
further including an ignition source configured and arranged to ignite fuel within the chamber, and
wherein the ignition source, piston lobes and clutch bearing for each drive shaft are configured and arranged to drive the drive shafts by utilizing the ignition source to ignite fuel in the chamber and therein generate pressure force upon a surface of one of the piston lobes that is translated to the drive shaft connected thereto.

13. The apparatus of claim 1, wherein the chamber has a toroidal-based shape with an outer surface of the drive shafts defining an inner portion of the surface of the chamber and the housing defining an outer portion of the surface of the chamber, further including one or more seals between interfaces of the drive shafts and the housing.

14. The apparatus of claim 1, further including an electric coil configured and arranged to generate electricity by utilizing movement of the magnetic field generated by each magnet.

15. The apparatus of claim 1, wherein the housing, inlet port, and exhaust port and piston lobes are configured and arranged to provide balanced forces in opposite directions and which generate additive torques upon the drive shaft.

16. The apparatus of claim 1, further including, for each piston lobe, a piston ring coupled around the piston lobe and configured and arranged to provide an interface between the piston lobe and the sidewall of the chamber.

17. An apparatus comprising:
first and second drive shafts having a common axis of rotation, each drive shaft being configured and arranged to rotate independently of the other drive shaft;
a housing around the drive shafts, the housing defining a sidewall of a chamber having inlet and exhaust ports; and
for each drive shaft,
a respective clutch bearing connected to the drive shaft and configured and arranged to limit rotation of the drive shaft to a rotational direction that is the same for both drive shafts, and
at least one piston lobe connected to the drive shaft, each piston lobe disposed within the chamber and configured and arranged to move circumferentially within the chamber and about the axis of rotation with the drive shaft, the piston lobes being configured and arranged with the housing, inlet port, and exhaust port to provide balanced forces in opposite directions and which generate additive torques upon the drive shaft.

18. The apparatus of claim 17, wherein a leading surface of each piston lobe forms an enclosed portion of the chamber bound by the leading surface, an interior surface of the chamber and a trailing surface of one of the piston lobes connected to the other drive shaft.

19. The apparatus of claim 18, wherein each shaft and the piston lobes connected thereto are configured and arranged to, in response to gas pressure within one of the enclosed portions of the chamber via gas provided through the inlet port, rotate the shaft utilizing the gas pressure on the trailing surface of one of the piston lobes while utilizing the clutch bearing to prevent rotation of the other shaft in the opposite rotational direction.

20. The apparatus of claim 17, wherein each shaft and the piston lobes connected thereto are configured and arranged to rotate in response to gas pressure upon on a trailing surface of one of the piston lobes while the clutch bearing prevents rotation of the other shaft in response to force applied by the gas pressure upon a leading surface of one of the piston lobes connected to the other shaft, the leading surface facing the rotational direction and the trailing surface facing opposite the rotational direction.

21. The apparatus of claim 17, wherein the piston lobes are arranged circumferentially around the shafts and equidistant from the axis of rotation, and have a seal around an outer sidewall thereof that interfaces with an inner sidewall of the chamber and therein separate portions of the chamber respectively bound by the leading and trailing surfaces of the lobe.

22. The apparatus of claim 17, wherein the piston lobes, drive shafts, chamber and clutch bearing are configured and arranged to:
draw gas in through the inlet port,
contain the gas within a portion of the chamber bound by sidewalls of the chamber and respective leading and trailing surfaces of adjacent ones of the piston lobes while utilizing expansion of the gas to drive the piston lobe having the trailing surface that bounds the portion of the chamber, and
upon rotation of the driven piston lobe past the exhaust port, exhaust the expanded gas from the chamber.

23. The apparatus of claim 17, wherein the at least one piston lobe includes a pair of piston lobes connected to the drive shaft, the pair of piston lobes extending in opposite directions relative to the drive shaft and counter-balancing one another.

24. The apparatus of claim 17, further including, for each piston lobe, a counter balance connected to the same drive shaft that the piston lobe is connected to and configured and arranged to counter balance the piston lobe relative to the axis of rotation.

25. The apparatus of claim 17, wherein the chamber and the piston lobes are circumferentially-arranged about the axis of rotation, with the sidewall and piston lobes exhibiting a sliding interface about sidewalls of the piston lobes via which the piston lobes separate the chamber into sub-chambers, the sub-chambers being bound by the sidewalls and respective leading and trailing surfaces of adjacent piston lobes.

26. The apparatus of claim 17, wherein the chamber has a toroidal-based shape and the piston lobes provide sub-chambers within the chamber, each sub-chamber being bound by a portion of the sidewall of the chamber and respective leading and trailing surfaces of circumferentially-adjacent ones of the piston lobes.

27. The apparatus of claim 26,
further including an ignition source, and
wherein the piston lobes, drive shafts and housing are configured and arranged with the ignition source to carry out a fuel combustion cycle by, for one of the sub-chambers:
in a fuel intake stage, receive fuel into the sub-chamber via the inlet port with the leading and trailing surfaces of the adjacent ones of the piston lobes engaged with the sidewall on opposite sides of the inlet port;
in a fuel combustion stage, provide a sealed combustion chamber between the sidewall and the leading and trailing surfaces that define the sealed combustion chamber, ignite the fuel in the sealed combustion chamber via the ignition source, and utilize the ignited fuel to drive the shaft connected to the piston lobe having the trailing surface that defines the combustion chamber by applying pressure from the ignited fuel upon the trailing surface; and
in an exhaust stage, exhaust gas generated by the ignited fuel via the exhaust port, with the leading and trailing surfaces of the adjacent ones of the piston lobes engaged with the sidewall on opposite sides of the exhaust port.

28. The apparatus of claim 17,
further including an ignition source configured and arranged to ignite fuel within the chamber, and
wherein the ignition source, piston lobes and clutch bearing for each drive shaft are configured and arranged to drive the drive shafts by utilizing the ignition source to ignite fuel in the chamber and therein generate pressure force upon a surface of one of the piston lobes that is translated to the drive shaft connected thereto.

29. The apparatus of claim 17, wherein the chamber has a toroidal-based shape with an outer surface of the drive shafts defining an inner portion of the surface of the chamber and the housing defining an outer portion of the surface of the chamber, further including one or more seals between interfaces of the drive shafts and the housing.

30. The apparatus of claim 17, wherein each piston lobe includes a magnet, the magnets of adjacent ones of the piston lobes having polarities that provide a magnetic field that generates a magnetic force in a direction that acts to repel the adjacent ones of the piston lobes away from one another.

31. The apparatus of claim 30, further including an electric coil configured and arranged to generate electricity by utilizing movement of the magnetic field generated by each magnet.

32. The apparatus of claim 17, further including, for each piston lobe, a piston ring coupled around the piston lobe and configured and arranged to provide an interface between the piston lobe and the sidewall of the chamber.

* * * * *